Dec. 23, 1930. F. W. PATTON 1,786,168
MULTIPLE SAW WOODWORKING MACHINE
Filed Aug. 24, 1926

Frederick W. Patton
Inventor
Attorney

Patented Dec. 23, 1930

1,786,168

UNITED STATES PATENT OFFICE

FREDERICK WILLIAM PATTON, OF VICTORIA, BRITISH COLUMBIA, CANADA

MULTIPLE-SAW WOODWORKING MACHINE

Application filed August 24, 1926. Serial No. 131,267.

This invention relates to combination wood-working machines in which revolving multiple saws form a salient feature, the object of my invention being to increase the rapidity of production and decrease the manufacturing costs of certain classes of woodwork in which a group of saws side by side can be used with good effect either for continuous or automatically intermittent work, such as grooved floor boards, plaster board, and the like.

The invention is particularly applicable to the production of plaster-board, which may consist of inferior timber or such as is unsuitable for other purposes but becomes with the aid of my machine, a first class product.

This material in the shape of boards is rapidly passed through the machine which simultaneously sizes it to requirements and cuts a series of staggered separate long narrow apertures, of a size suitable for receiving the impressed plaster, and so providing the necessary locking effect for it.

These series of apertures are produced by gangs of parallel and inter-spaced saws which intermittently engage the boards as they traverse the machine.

The most important factor in my invention consists in the employment of a series of revolvable groups of circular saws, symmetrically spaced around a common spindle, suitably housed within a framework carrying a table below which the saw combination revolves. Other revolving tools engage the work as it traverses the table under suitable mechanical propulsion, the whole co-acting with the revolving saw groups to produce various types of work.

Figure 2:
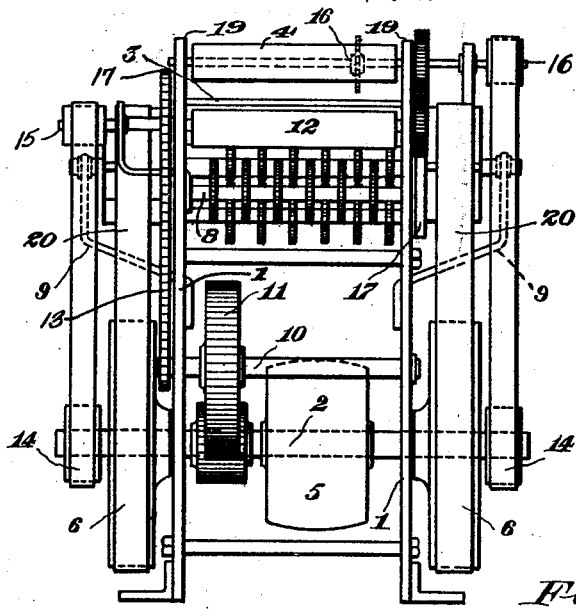
Figure 1:
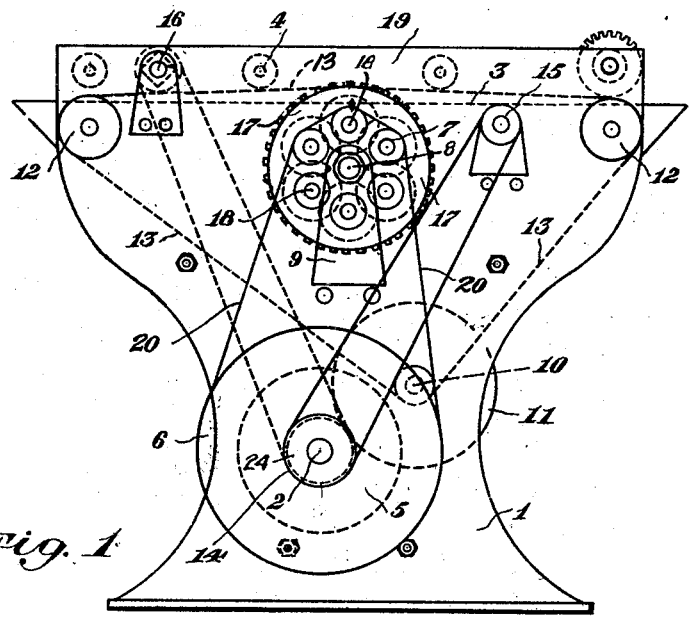

The invention will be better understood and is more clearly described by reference to the drawings herewith which form part of this application, in which Fig. 1 is a side elevation of my machine, and Fig. 2 an end view.

Taking the drawings in detail 1 is a side of the framework within and around which the machine is built, 2 is the main driving shaft, 3 the table for receiving the work, 4 the rolls which engage the woodwork in its traverse across the machine, 5 the main driving pulley, and 6 the saw driving pulleys on each side of the frame. The latter drive by the belts 20 intermittently and in turn the six saw pulleys 7 on each side of the machine and around the ends of the multiple saw spindle 8. 9 are brackets carrying the extremities of the multiple saw spindle 8. In Fig. 2 the table 3 is removed to expose the parts below, 10 being the countershaft driven by the spur gearing 11 driving the traverse rolls 12 by the chain 13. The outside belt pulleys 14 drive a revolving cutter at 15 and a saw spindle at 16. The multiple saw combination consists in this case of a main spindle 8 to which are secured flange members 17 the latter carrying the six bearings of the saw spindles 18, each of which carries in this case six circular saws making a total of thirty-six saws for the combination. It is to be noted that the main saw spindle 8 receives motion from the countershaft 10 in a direction opposite that of the multiple saw driving pulleys 6, through a sprocket wheel secured to the flange member 17, and the chain 13 which operates the traverse rolls 12. Thus the traverse of the saws coincides in direction with that of the work and is opposite the peripheral direction of the saw teeth. The saw table carries a substantial side fence at 19 on each longitudinal side. It is obvious that other schemes and types of gearing may be employed to effect the same result without detracting from the value of the invention.

From the above description it will be seen that work can be passed to the table operated upon in a variety of ways according to the disposition of the saws and tools, either continuously by the tools having a rigid axis or intermittently by the tools having a movable axis.

Having thus fully described my invention what I claim as new and desire to secure by Letters Patent, is:

In a multiple-saw wood-working device for the production of plaster-board the combination comprising, a framework carrying a horizontal saw table with a main shaft transversely below it, a double flange member secured to said shaft and carrying a plurality of bearings whose axes are parallel with and symmetrically disposed around the axis of said shaft sprockets on the periphery of one of said flanges and means for rotating said flange member by a driving chain engaging said sprockets, spindles secured to circular saws and revolvable in said bearings, belt pulleys secured to said spindles at each end thereof, a driving belt engaging simultaneously a plurality of adjacent pulleys, the said spindles being so disposed that the projected peripheries of saws on adjacent spindles intersect thereby producing an inter-spaced or break-joint effect in the disposition of the cuts made by the said saws in the plaster-board.

FREDERICK WILLIAM PATTON.